US010431859B2

(12) United States Patent
Kim et al.

(10) Patent No.: US 10,431,859 B2
(45) Date of Patent: Oct. 1, 2019

(54) BATTERY PACK

(71) Applicant: LG ELECTRONICS INC., Seoul (KR)

(72) Inventors: Inseok Kim, Seoul (KR); Ingook Son, Seoul (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 15/662,566

(22) Filed: Jul. 28, 2017

(65) Prior Publication Data

US 2018/0138564 A1 May 17, 2018

(30) Foreign Application Priority Data

Nov. 15, 2016 (KR) ........................ 10-2016-0152246

(51) Int. Cl.
| | |
|---|---|
| *H01M 10/6551* | (2014.01) |
| *H01M 10/613* | (2014.01) |
| *H01M 10/6554* | (2014.01) |
| *H01M 2/10* | (2006.01) |
| *H01M 2/30* | (2006.01) |
| *H01M 10/653* | (2014.01) |
| *H01M 10/647* | (2014.01) |

(Continued)

(52) U.S. Cl.
CPC ..... *H01M 10/6551* (2015.04); *H01M 2/1061* (2013.01); *H01M 2/1077* (2013.01); *H01M 2/30* (2013.01); *H01M 10/613* (2015.04); *H01M 10/647* (2015.04); *H01M 10/653* (2015.04); *H01M 10/6554* (2015.04); *H01M 10/6555* (2015.04); *H01M 10/6556* (2015.04); *H01M 2220/30* (2013.01)

(58) Field of Classification Search
CPC .. H01M 10/6551; H01M 10/613; H01M 2/30; H01M 2/1077
See application file for complete search history.

(56) References Cited

U.S. PATENT DOCUMENTS

| | | |
|---|---|---|
| 2013/0122339 A1 | 5/2013 | Chae et al. |
| 2013/0224524 A1 | 8/2013 | Nam |
| 2014/0186669 A1 | 7/2014 | Obasih et al. |

(Continued)

FOREIGN PATENT DOCUMENTS

| | | |
|---|---|---|
| EP | 3131138 A1 | 2/2017 |
| EP | 3142170 A1 | 3/2017 |

(Continued)

OTHER PUBLICATIONS

Extended European Search Report in European Application No. 17190569.8, dated Feb. 1, 2018, 15 pages.

(Continued)

*Primary Examiner* — Matthew J Merkling
(74) *Attorney, Agent, or Firm* — Fish & Richardson P.C.

(57) ABSTRACT

A battery pack includes a plurality of battery modules that are stackable in a stacking direction, each of the plurality of battery modules extending in a longitudinal direction perpendicular to the stacking direction. Each of the plurality of battery modules includes a battery cell and a cartridge configured to receive the battery cell. The cartridge includes a seat part configured to seat the battery cell, and a heat dissipation part made of a first type of material different from a second type of material of the seat part, the heat dissipation part being configured to absorb heat generated from the battery cell.

2 Claims, 11 Drawing Sheets

(51) Int. Cl.
  *H01M 10/6555* (2014.01)
  *H01M 10/6556* (2014.01)

(56) References Cited

U.S. PATENT DOCUMENTS

| | | |
|---|---|---|
| 2014/0186683 A1 | 7/2014 | Tyler et al. |
| 2014/0186687 A1 | 7/2014 | Obasih et al. |
| 2014/0186693 A1 | 7/2014 | Tyler et al. |
| 2015/0162639 A1 | 6/2015 | Lee |
| 2016/0036019 A1 | 2/2016 | Gunna |
| 2016/0133861 A1 | 5/2016 | Li |
| 2017/0062879 A1 | 3/2017 | Roh |
| 2017/0125752 A1 | 5/2017 | Kim |
| 2017/0237131 A1 | 8/2017 | Gunna |

FOREIGN PATENT DOCUMENTS

| | | |
|---|---|---|
| JP | 2014082170 A1 | 5/2014 |
| KR | 2010115709 A1 | 10/2010 |
| KR | 2015050449 A1 | 5/2015 |
| KR | 2015115253 A1 | 10/2015 |
| KR | 1020150113827 | 10/2015 |
| KR | 10-2015-0132903 | 11/2015 |
| KR | 2015137993 A1 | 12/2015 |
| KR | 1020160071109 | 6/2016 |
| KR | 2016115582 A1 | 10/2016 |
| WO | WO2015170920 A1 | 11/2015 |

OTHER PUBLICATIONS

Partial European Search Report (R.64 EPC) in European Application No. 17190569.8, dated Nov. 7, 2017, 14 pages (with English translation).

BATTERY PACK

CROSS-REFERENCE TO RELATED APPLICATIONS

This application claims priority under 35 U.S.C. §§ 119 and 365 to Korean Patent Application No. 10-2016-0152246 filed on Nov. 15, 2016, in Korea, the entire contents of which are hereby incorporated by reference in its entirety.

FIELD

The present disclosure relates to a battery pack and, for example, to a battery pack including a cartridge including a heat dissipation part that can dissipate heat that is generated by battery cells.

BACKGROUND

A battery pack is a device that can be assembled from a plurality of battery cells and can supply power to other device(s) connected to the battery pack. A battery pack can be used in various industrial fields and various devices, such as mobile phones, home appliances, and vehicles.

For example, a battery pack may be mounted and used in electric vehicles that can be driven by the power from a driving motor, the battery pack may be formed by combining a plurality of battery modules, and the battery modules may each include at least one battery cell.

In some cases, a battery pack may include a cooling cover for dissipating heat that is generated by battery cells. The cooling cover may be combined with a cartridge. In this case, the cooling cover may be made of metal, which may increase the weight of a battery pack.

SUMMARY

According to one aspect of the subject matter described in this application, a battery pack includes a plurality of battery modules that are stackable in a stacking direction, each of the plurality of battery modules extending in a longitudinal direction perpendicular to the stacking direction. Each of the plurality of battery modules includes a battery cell and a cartridge configured to receive the battery cell. The cartridge includes a seat part configured to seat the battery cell, and a heat dissipation part made of a first type of material different from a second type of material of the seat part, the heat dissipation part being configured to absorb heat generated from the battery cell.

Implementations according to this aspect may include one or more of the following features. The heat dissipation part may be located on the seating part and extend in the stacking direction within the cartridge. The battery cell may include a body and a plurality of cell leads, each of the plurality of cell leads being located at a first side of the body. The body may have a second side different than the first side, the second side facing the heat dissipation part.

In some implementations, the battery pack may further include a bonding member disposed between the second side of the body and the heat dissipation part. In some cases, the battery pack may further include a thermal pad connected to the heat dissipation part. The battery cell may include a body, a cathode cell lead, and an anode cell lead, the cathode and anode cell leads being connected to the body, and the cartridge may further include anti-short members that protrude from the seat part in the stacking direction, the anti-short members being disposed between the cathode cell lead and the anode cell lead based on the cartridge receiving the battery cell.

In some examples, each of the anti-short members may include a locking portion that is located at a first side of the cartridge and that extends in a first direction parallel to the stacking direction, and a locking step that is located at the first side of the cartridge and that extends in a second direction opposite the first direction. In this case, the locking portion is configured to couple to a locking step of an adjacent cartridge based on the adjacent cartridge being stacked next to the cartridge. In some examples, the cartridge may include second locking portions and locking grooves, the second locking portions and locking grooves being located at a second side of the cartridge opposite the first side. In these examples, the second locking portions are configured to couple to locking grooves of the adjacent cartridge based on the adjacent cartridge being stacked next to the cartridge.

In some implementations, the battery pack may further include end plates that are located next to outermost battery modules of the battery pack, the end plates extending in the longitudinal direction perpendicular to the stacking direction, and brackets that couple to the end plates and extend in the stacking direction, the brackets covering outer sides of the plurality of battery modules. Each of the brackets may face an outer side of the seat part of the cartridge. The battery pack may also include bolting portions configured to couple the brackets to the end plates.

The battery pack may further include a separator that is disposed between a pair of battery modules within the plurality of battery modules, the separator extending in the longitudinal direction. The brackets are configured to couple to the separator. In some examples, the battery pack may further include bolting portions configured to couple the brackets to the separator. The separator may include a cartridge locking step that protrudes from an end portion of the separator toward the bracket, the cartridge locking step being configured to couple to the pair of battery modules that are stacked next to each other.

In some examples, at least a portion of the seat part is coated by the heat dissipation part. The heat dissipation part may include a first heat dissipation member and a second heat dissipation member that faces the first heat dissipation member. In these examples, a portion of the seat part is disposed between the first and second heat dissipation members.

In some implementations, the battery pack may further include a shock-absorbing member disposed between a pair of battery cells within the plurality of battery modules and configured to absorb shock from the pair of battery cells that are stacked next to each other. In some examples, the anode cell lead may be configured to contact an anode cell lead of an adjacent battery cell based on the battery cell being stacked next to the adjacent battery cell, and the cathode cell lead may be configured to contact a cathode cell lead of the adjacent battery cell based on the battery cell being stacked next to the adjacent battery cell.

According to another aspect of the subject matter described in this application, a battery pack includes: a first plurality of battery modules that are electrically connected to a first ground; a second plurality of battery modules that are electrically connected to a second ground, the second plurality of battery modules being stacked next to the first plurality of battery modules; a separator that is disposed between the first plurality of battery modules and the second plurality of battery modules, the separator being configured to electrically separate the first and second grounds; a bracket that is coupled to the separator and covers a side of each of the first plurality of battery modules and the second plurality of battery modules; a first board assembly is located between the bracket and the side of the first plurality of battery modules; and a second board assembly that is located between the bracket and the side of the second plurality of battery modules. Each battery module in the first and second pluralities of battery modules includes a battery cell and a cartridge configured to receive the battery cell, and the cartridge includes a seat part configured to seat the battery cell, and a heat dissipation part made of a first type of material different from a second type of material of the seat part, the heat dissipation part being configured to absorb heat generated from the battery cell.

Implementations according to this aspect, the separator may include a cartridge locking step that protrudes from an end of the separator toward the bracket, the cartridge locking step being configured to couple to the first and second pluralities of battery modules.

According to an implementation of the present disclosure, it is possible to discharge heat through the heat dissipation parts that are disposed in the cartridges and made of a different material from the cartridges, without a separate cooling cover that is disposed by the battery cell, and to reduce the weight and size of the battery pack.

Further, since there is no cooling cover, it is possible to reduce the volume and weight of the battery pack and increase the energy density per unit volume.

Further, the battery modules, the separator, and the end plates are fixed without long bolts, so it is possible to reduce the volume of the battery pack.

DETAILED DESCRIPTION

Figure 1:
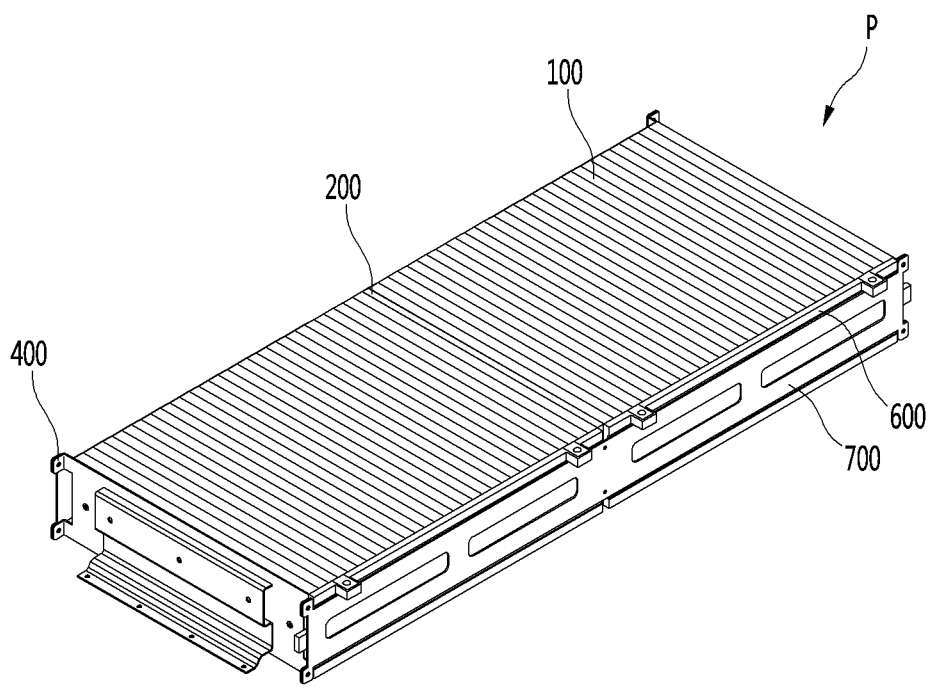
FIG. 1 is a perspective view showing an example battery pack.
Figure 2:
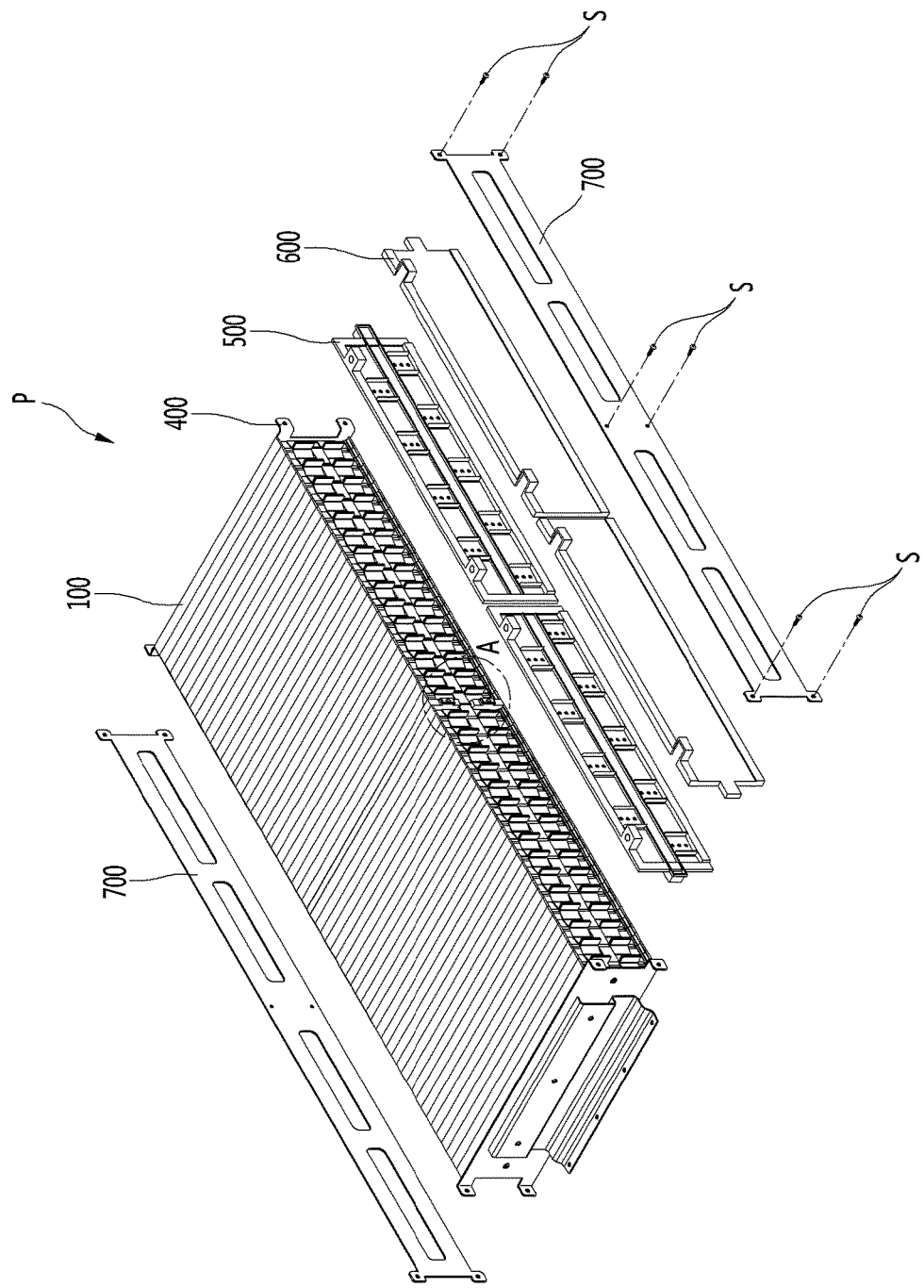
FIG. 2 is an exploded perspective view showing the example battery pack.
Figure 3:
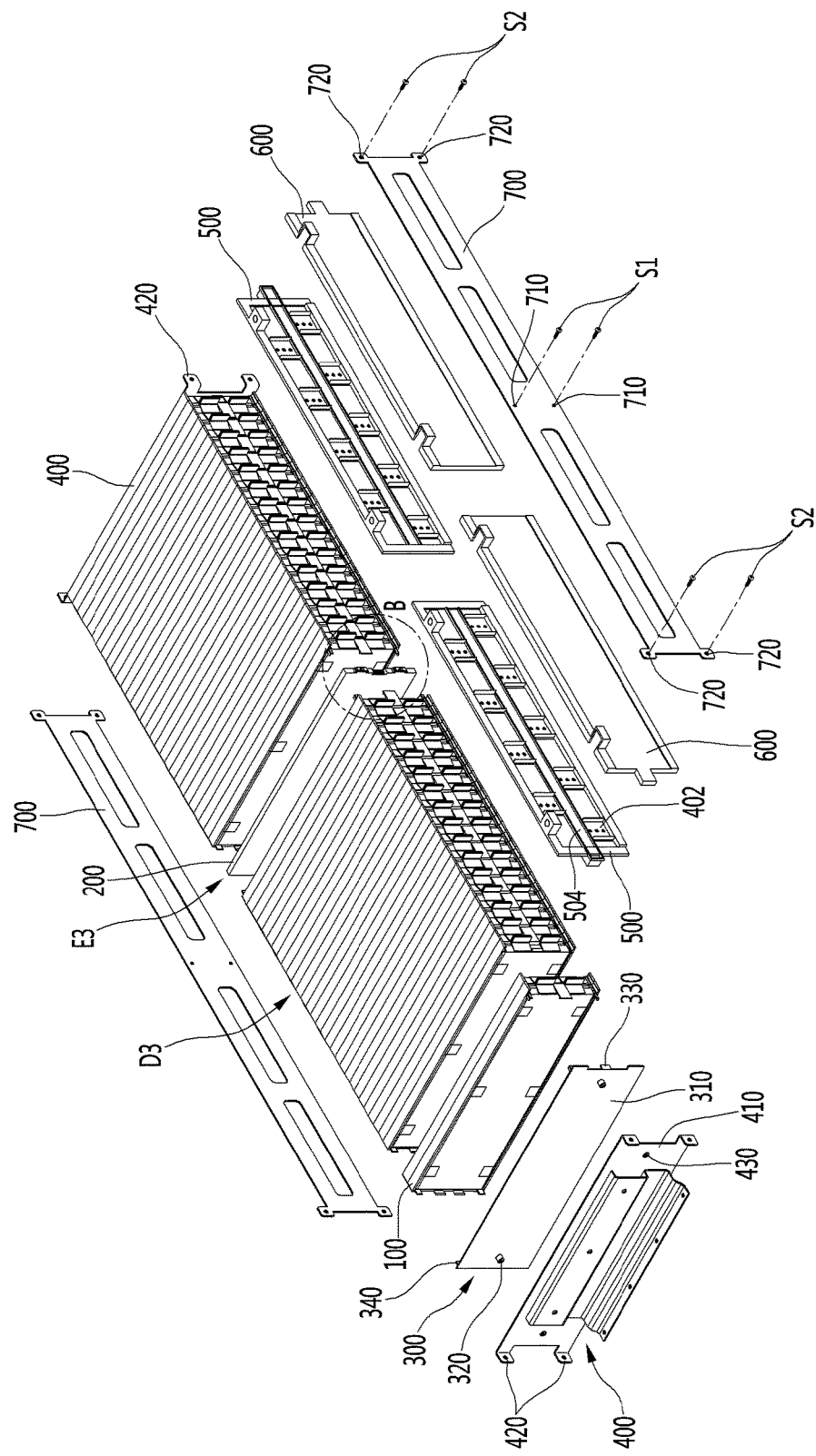
FIG. 3 is an exploded perspective view of FIG. 2.
Figure 4:
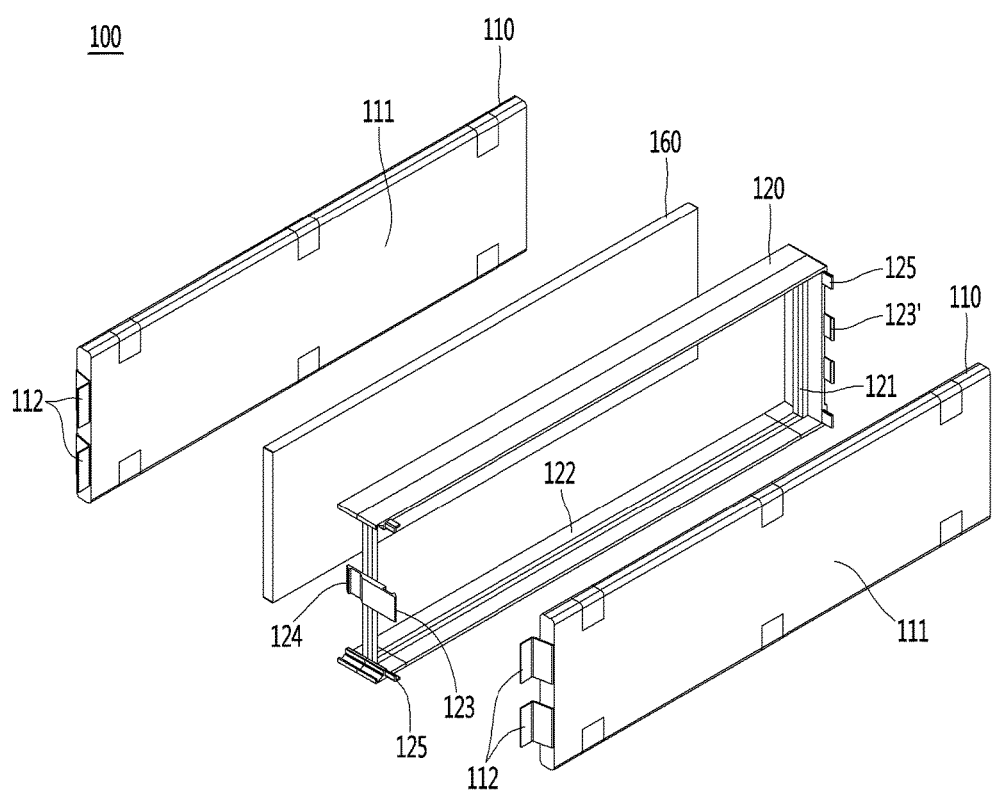
FIG. 4 is an exploded perspective view showing an example battery module.
Figure 5:
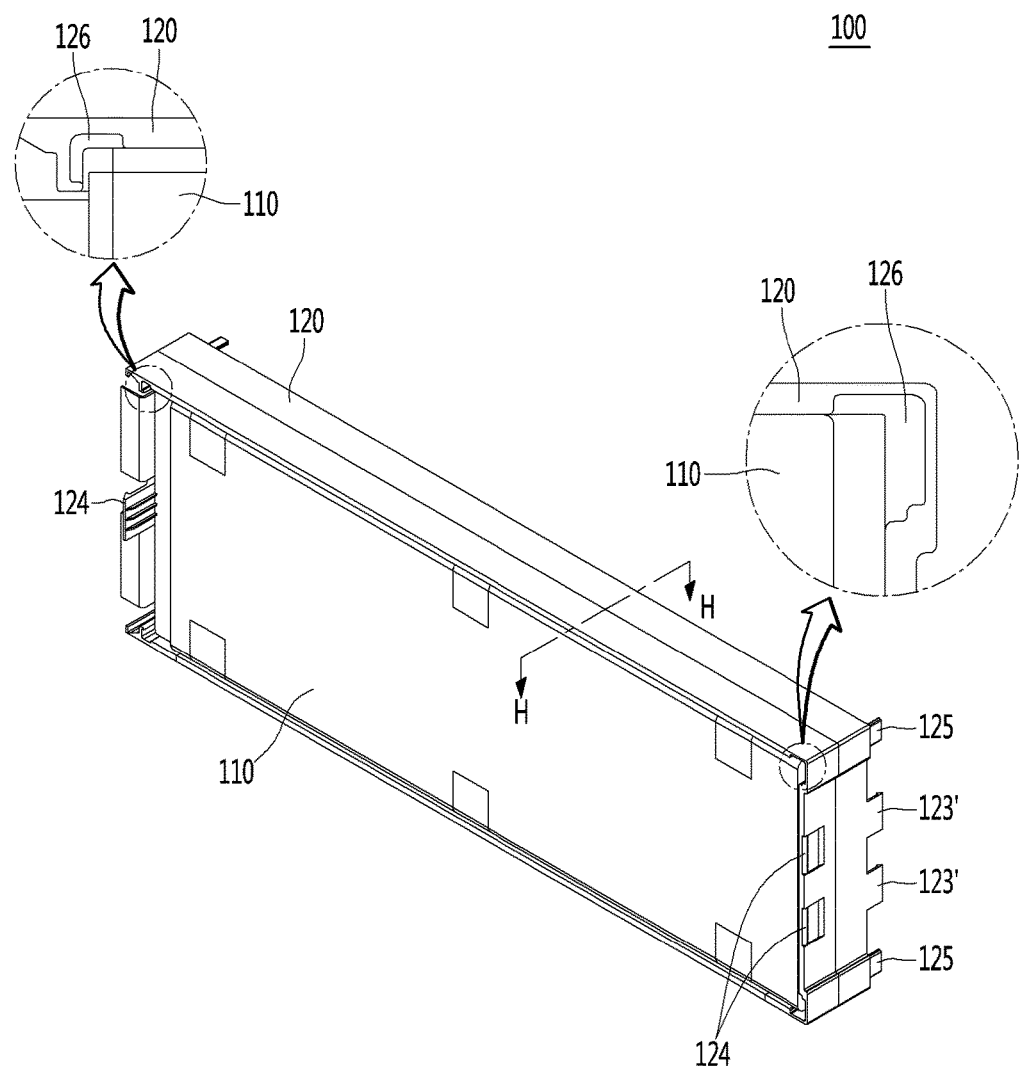
FIG. 5 is a perspective view showing the example battery module.
Figure 6:
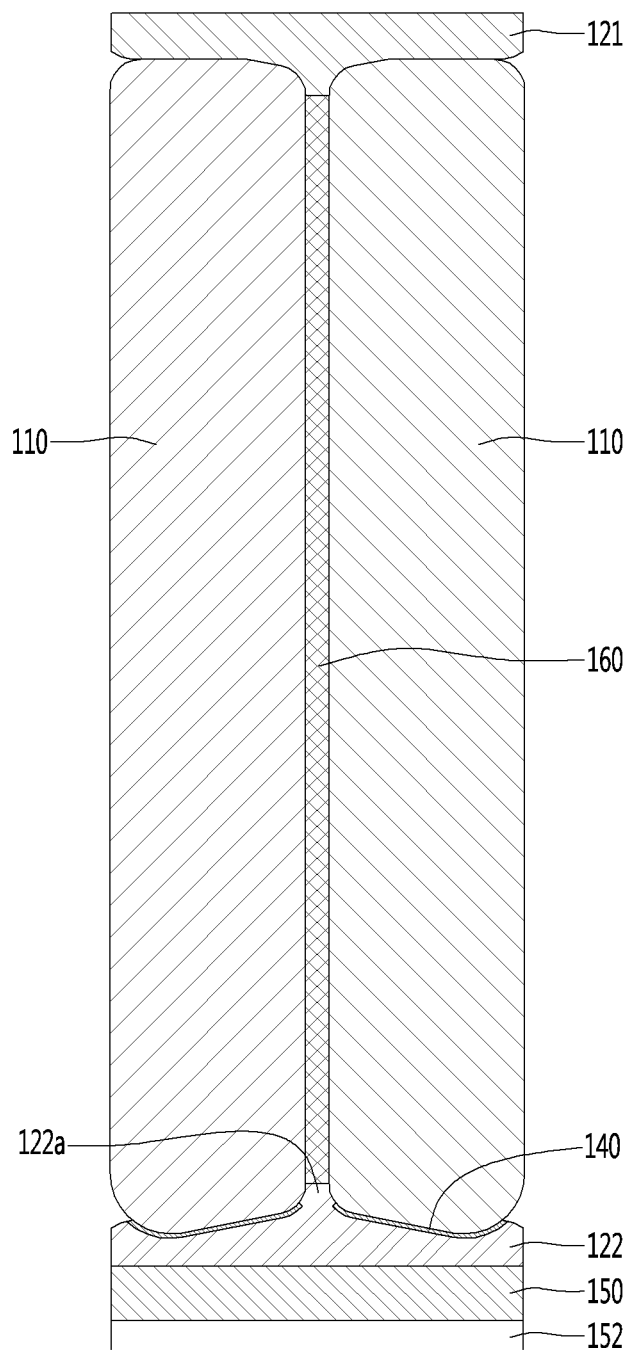
FIG. 6 is a cross-sectional view of the example battery module taken along the line H-H in FIG. 5.

FIG. 1 is a perspective view illustrating an example battery pack, FIG. 2 is an exploded perspective view of the example battery pack, and FIG. 3 is an exploded perspective view showing the example battery pack of FIG. 2. FIG. 4 is an exploded perspective view illustrating an example battery module, FIG. 5 is a perspective view of the example battery module, and FIG. 6 is a cross-sectional view of the example battery module taken along line H-H in FIG. 5.

A battery pack P may include a pair of end plates 400 and a plurality of battery modules 100 disposed between the end plates 400.

The battery modules 100 may be stacked between the end plates 400. The battery modules 100 may be stackable in a stacking direction between the end plates 400. For example, the battery modules 100 may be horizontally or vertically stacked between the end plates 400.

In some implementations, the battery modules 100 may be divided into a plurality of groups by a separator 200. The battery pack P may include the separator 200 that separates any one ground from the other group of the groups.

The battery pack P may include a separator 200 disposed between a pair of battery modules 100. The battery pack P may further include a pair of end plates 400 spaced from each other in the stacking direction of the separator 200 and the battery modules 100. The battery pack P may further include brackets 700 fixed to the end plates 400 and the separator 200.

The battery modules 100 each may include at least one battery cell 110 and a cartridge 120 in which the battery cell 110 is mounted.

The cartridge 120 may have a seat 121 where the battery cell 110 is seated and a heat dissipation part 122 that absorbs heat from the battery cell 110.

The seat 121 may serve as a cartridge body surrounding a portion of the battery cell 110. The seat 121 may surround all of the front end, the rear end, and the top of the battery cell 110. The seat 121 may further surround a portion of the bottom of the battery cell 110.

The battery cell 110 may be seated inside the seat 121. A plurality of battery cells 110 may be seated inside the seat 121 and a shock-absorbing member 160 may be disposed between a pair of battery cells 110. The shock-absorbing member 160 can absorb shock between the battery cells 110. Alternatively, the shock-absorbing member 160 can protect a battery cell 110 by absorbing shock when another adjacent battery cell 110 inflates.

The heat dissipation part 122 may be disposed on any one of four sides of the cartridge 120. The heat dissipation part 122 may be formed on a side in the width direction of the cartridge 120. The heat dissipation part 122 may be elongated on the seat 121 in the width direction of the cartridge 120. The heat dissipation part 122 may be made of a different material from the seat 121. For example, the heat dissipation part 122 may be made of metal having high thermal conductivity.

The battery cell 110 has a body 111 and cell leads 112 connected to the body 111.

The body 111 may be disposed with one side facing the heat dissipation part 122. The body 111 may be disposed with other sides facing the heat dissipation part 122, except for the side connected with the cell leads 112. A side in the width direction of the body 111 may face the heat dissipation part 122. The side, which faces the heat dissipation part 122, of the body 111 may be in contact with the heat dissipation part 122. Heat of the battery cell 110 may be transmitted to the heat dissipation part 122 through the side facing the heat dissipation part 122 of the body 111.

The cell leads 112 may protrude forward from the front side of the body 11 or protrude rearward from the rear side of the body 111. Other sides except for the front and rear sides of the body 111 may face the heat dissipation part 122. The bottom of the body 111 may face the heat dissipation part 122 and heat of the body 111 may be transmitted to the heat dissipation part 122 through the bottom of the body 111.

The heat dissipation part 122, for example, may be a long bar-shaped heat dissipation plate. The length of the heat dissipation plate may be the same as or smaller than that of the battery cell 110.

The seat 121 may have a top plate, a side plate disposed at a side in the width direction, and another side plate disposed at another side in the width direction. The heat dissipation part 122 may be disposed at the lower portion of the seat 121.

In the cartridge 120, for example, the seat 121 may be open at the entire bottom and the heat dissipation part 122 may cover the bottom of the seat 121.

In another example cartridge 120, the seat 121 may have a bottom plate that is partially open and the heat dissipation part 122 may be coupled to the bottom plate of the seat 121 to cover the open portion of the seat 121.

In another example the cartridge 120, the seat 121 may have seating ribs on the bottom plate to mount the heat dissipation part 122 and the heat dissipation plate 122 may be partially mounted on the seating ribs.

A side of the heat dissipation part 122 may face the internal space of the cartridge 120 and the side facing the internal space of the cartridge 120 may be a heat-absorbing side that absorbs heat of the battery cell 110 in contact with the battery cell 110.

When the cartridge 120 is seen from the outside, another side of the heat dissipation part 122 may be exposed to the outside and the side exposed to the outside of the heat dissipation part 122 may be a heat dissipation side that dissipates heat of the heat dissipation part 122 to the outside of the cartridge 120.

The battery cell 110 may be in direct contact with the heat dissipation part 122.

In some implementations, the battery cell 110 may not be fixed to the heat dissipation part 122, but may be mounted on the heat dissipation part 122 and may be in contact with the side, which faces the battery cell 110, of the heat dissipation part 122.

In some cases, the battery cell 110 may be bonded to the heat dissipation part 122. The battery cell 110 may be thermally bonded to the heat dissipation part 122. By thermally bonding the battery cell 110 and the heat dissipation part 122, thermal conductivity can be improved. When the battery cell 110 and the heat dissipation part 122 are thermally bonded, a thermal joint may be formed between the battery cell 110 and the heat dissipation part 122 in the battery module 100.

In some implementations, a bonding member may be further disposed between a side of the body 111 and the heat dissipation part 122. The bonding member may be a heat conduction bond 140 disposed between the battery cell 110 and the heat dissipation part 122 to increase thermal conductivity between the battery cell 110 and the heat dissipation part 122.

The heat conduction bond 140 may be configured to couple the battery cell 110 and the heat dissipation part 122 to each other and transmit heat of the battery cell 110 to the heat dissipation part 122 in contact with the battery cell 110 and the heat dissipation part 122.

The heat dissipation part 122, as shown in FIG. 6, may further include a seating step 122a protruding inside the cartridge 120. The seating step 122a can maintain the battery cells 110 in position.

The seating step 122a may protrude between the cells 110. Alternatively or additionally, the seating step 122a may protrude toward the shock-absorbing member 160. The seating step 122a may function as a spacer for spacing the battery cells 110. The seating step 122a may be in contact with the battery cells 110 and heat of the battery cells 110 may transfer to the seating step 122a.

In some examples, the seating step 122a may be smaller in height than the shock-absorbing member 160 and may be in contact with predetermined sides of the battery cells 110. The seating step 122a may protrude from the side, which faces the inside of the cartridge, of the heat dissipation part 122. The end of the seating step 122a may be in contact with the shock-absorbing member 160. The shock-absorbing member 160 may be supported by the seating step 122a, whereby it is possible to minimize movement of the shock-absorbing member 160 between the battery cells 110.

The heat dissipation part 122 may be formed at several areas in the cartridge 120. For example, when heat generated by the battery module 100 is not sufficiently dissipated only through the heat dissipation part 122 at a side of the cartridge 120, the heat dissipation part 122 may be formed at another side of the cartridge 120. The heat dissipation part 122 may be formed on the side in the width direction of the cartridge 120. The heat dissipation part 122 may be elongated in the width direction of the cartridge 120.

The cartridge 120 may have an entirely hollow rectangular frame and the heat dissipation part 122 may be disposed on any one of four sides of the cartridge 120. The cartridge 120 may have, on the bottom, a seat part 121 having an opening and a heat dissipation part 122 disposed in the opening of the seat part 121. In this case, the bottom of the battery cell 110 may be entirely or partially mounted on the heat dissipation part 122 and the load of the battery cell 110 may be applied to the heat dissipation part 122. The heat dissipation part 122 may be maintained closest to the battery cell 110 by the weight of the battery cell 110.

The heat dissipation part 122 is not limited to the implementation described above and may be coated on at least a portion of the seat part 121 of the cartridge 120. In this case, the seat part 121 of the cartridge 120 may have an angular shape or a rectangular frame shape and the heat dissipation part 122 may be coated on at least a portion of the bottom plate of the seat part 121.

In some implementations, the battery pack P may further include a thermal pad 150 that is in contact with the heat dissipation part 122. The thermal pad 150 may be connected to the heat dissipation part 122 to be in contact with the heat dissipation part 122. The thermal pad 150 may receive heat generated by the battery cell 110 through the heat dissipation part 122. The thermal pad 150 may be attached to the side of the heat dissipation part 122 that is opposite to the battery cells 110. The thermal pad 150 may be made of a material having high thermal conductivity, so it can effectively distribute heat.

The heat dissipation part 122 in the battery pack P may be cooled by air or a refrigerant.

For example, when the heat dissipation part 122 of the battery pack P is cooled by air, the battery pack P may further include a heat sink that can dissipate heat of the heat dissipation part 122. In other examples, when the battery pack P does not include the thermal pad 150, the heat sink may integrally protrude from the heat dissipation part 122 or may be attached to the heat dissipation part 122. When the battery pack P further includes the thermal pad 150, the heat sink may be attached to the thermal pad 150. The heat sink can dissipate heat from the heat dissipation part 122 by exchanging heat with air.

In some cases, when the heat dissipation part 122 of the battery pack P is cooled by air, the heat dissipation part 122 or the thermal pad 150 may be in contact with a heat exchanger 152 through which a refrigerant can pass.

In some implementations, when the battery pack P does not include the thermal pad 150, the heat dissipation part 122 may be in contact with the heat exchanger 152 and the heat of the heat dissipation part 122 may be absorbed into the heat exchanger 152. In some examples, when the battery pack P includes the thermal pad 150, a side of the thermal pad 150 may be in contact with the heat dissipation part 122 and another side thereof may be in contact with the heat exchanger 152, and the heat transmitted to the thermal pad 150 from the heat dissipation part 122 may be absorbed into the heat exchanger 152.

In some related examples, a separate cooling cover that is in surface contact with sides of battery cells and sides of a cartridge was used to dissipate heat from the battery cells. The cooling cover covers the sides of the cartridge and the sides of the battery cells and increases the weight of a battery pack.

According to the present disclosure, the battery module 100 can discharge heat from the battery cells 110 through the heat dissipation part 122 that is a portion of the cartridge 120. The heat dissipation part 122 is one of four sides of the cartridge 120, so it is not large in volume, as compared with the cooling cover. Further, since the heat dissipation part 122, which is a part of the cartridge 120, can efficiently discharge heat from the battery cells 110, it may be not necessary to have a cooling cover that covers sides of the battery cells 110.

Further, the heat dissipation part 122 can be made of metal in a relatively small size, so it may be possible to decrease the weight of the battery pack P, as compared with a battery pack P equipped with a cooling cover.

In some implementations, the cartridge 120, as shown in FIGS. 5 and 6, may further have coupling projections 125 that protrude from the side in the width direction of the cartridge 120 and coupling grooves 126 spaced from the coupling projections 125.

The battery modules 100 may be stacked and the coupling projections 125 may be inserted in the coupling grooves 126 formed at a side in the width direction of the cartridge 120 of another adjacent battery module 100.

The cartridge 120 may further have coupling projections 125 that protrude from another side in the width direction of the cartridge 120 and coupling grooves 126 spaced from the coupling projections 125.

A plurality of battery modules 100 may be stacked and the coupling projections 125 may be inserted in the coupling grooves 126 formed at another side in the width direction of the cartridge 120 of another adjacent battery module 100.

Figure 7:
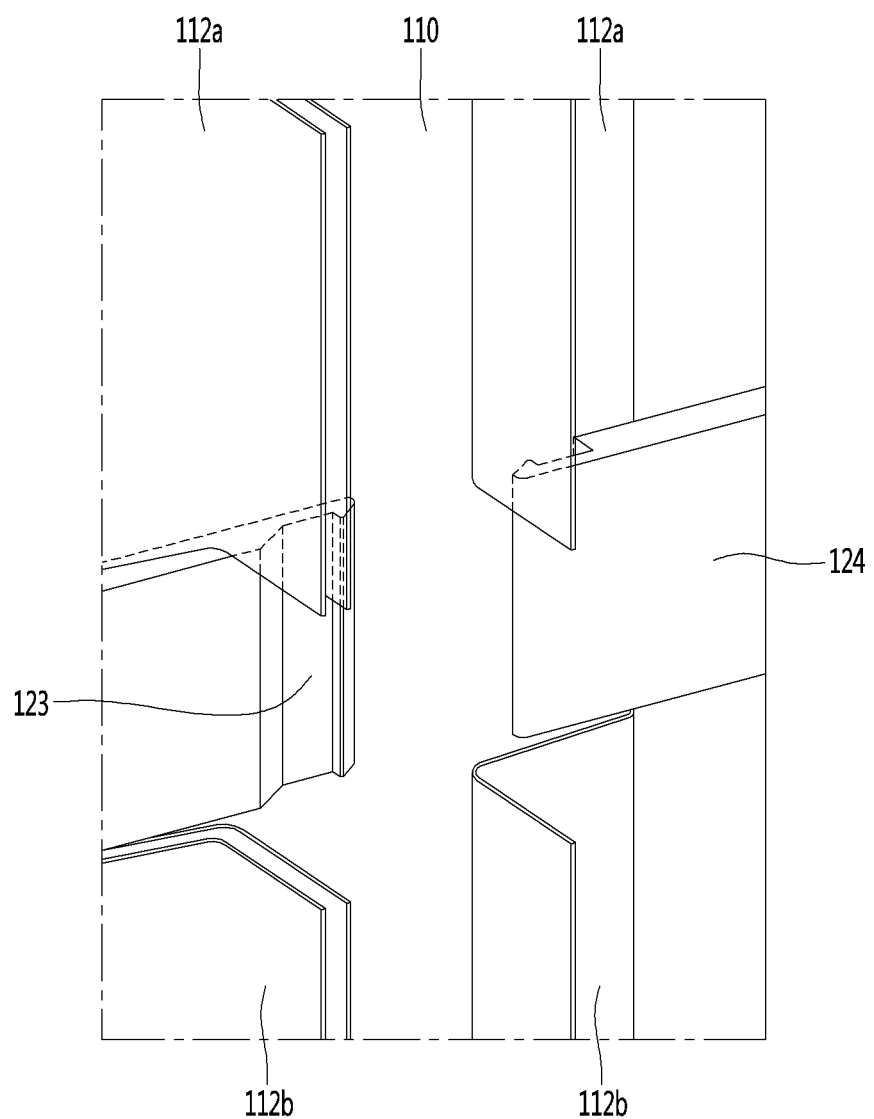
FIG. 7 is a perspective view showing a locking portion of an example cartridge and a locking step of another example cartridge that is unlocked from the locking portion.
Figure 8:
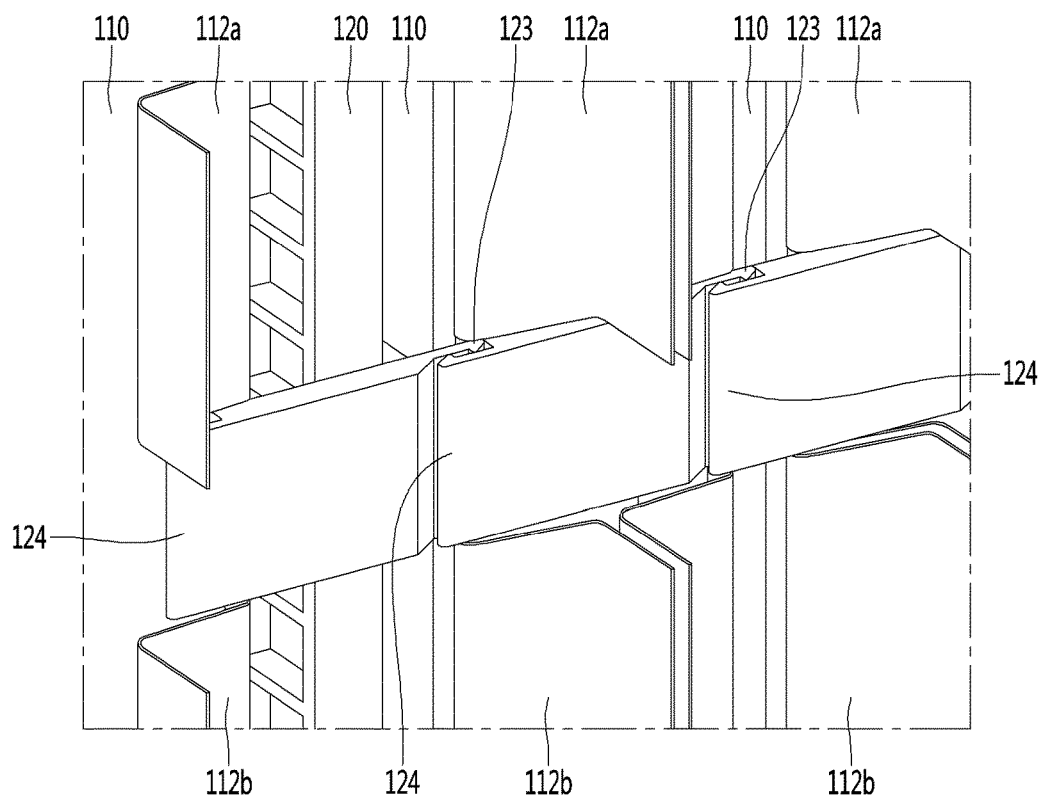
FIG. 8 is a perspective view showing a locking portion of an example cartridge and a locking step of another example cartridge that is coupled to the locking portion.
Figure 9:
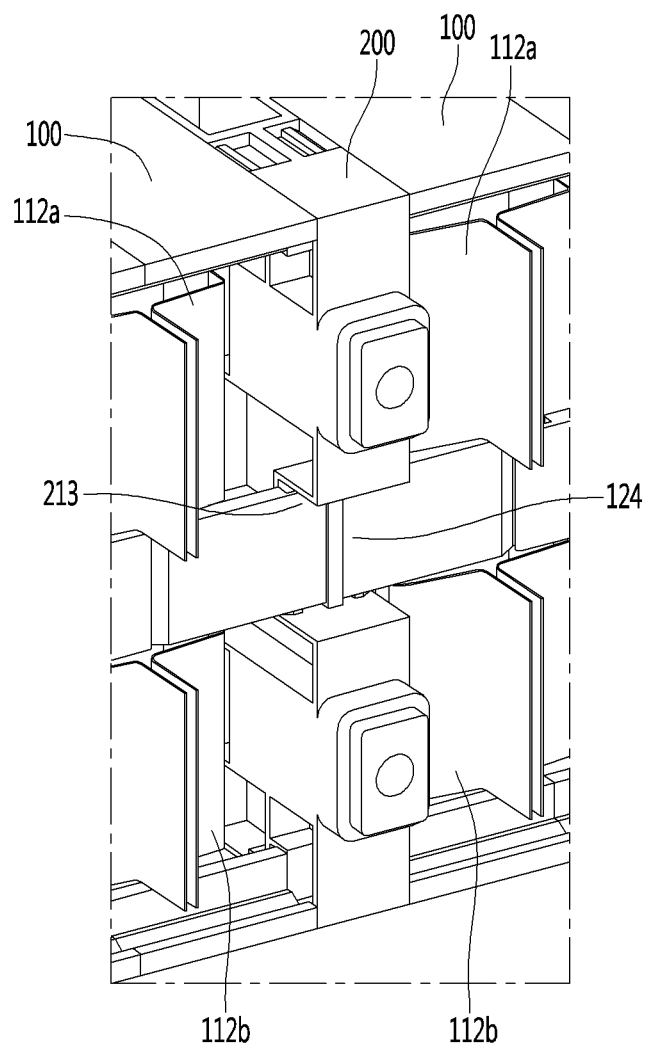
FIG. 9 is an enlarged view of the portion A in FIG. 2.
Figure 10:
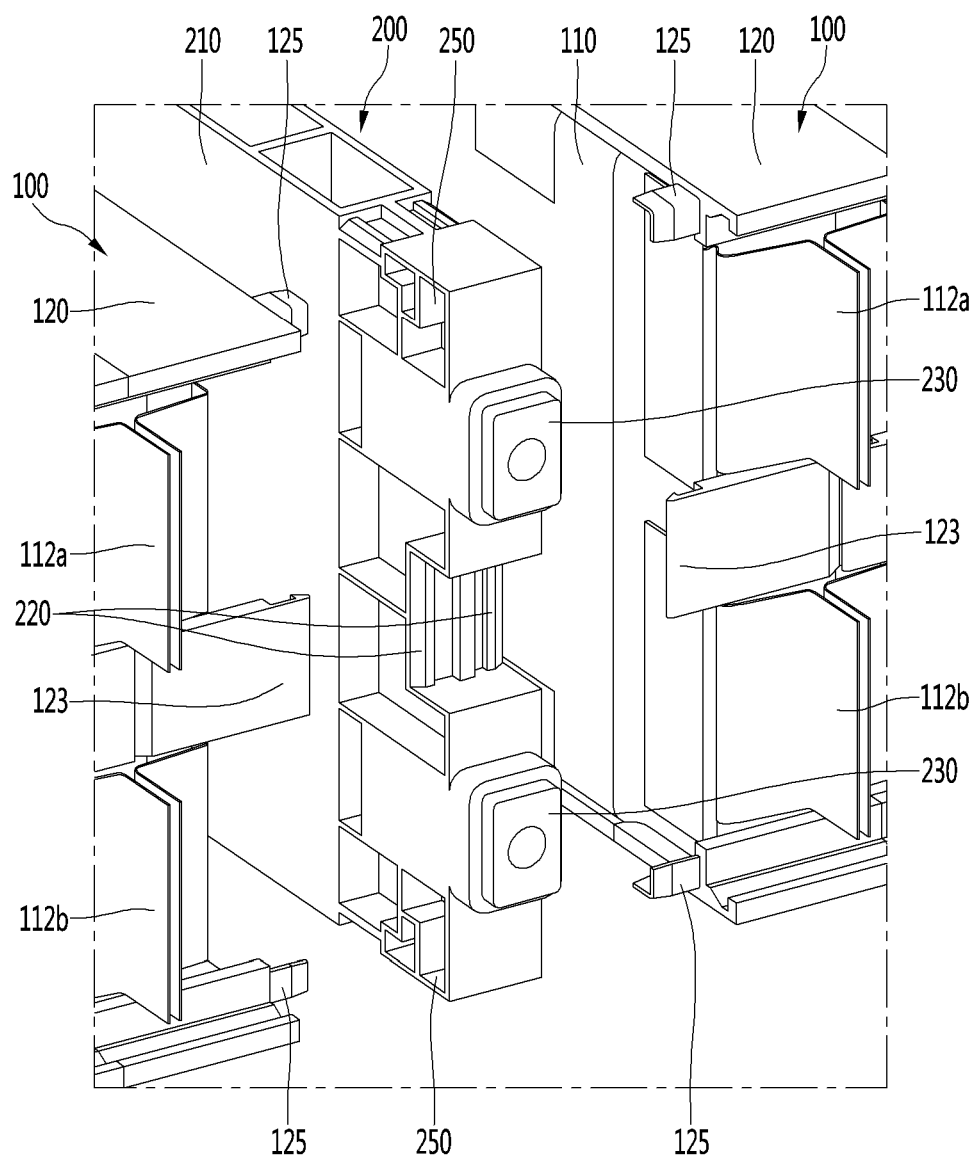
FIG. 10 is an enlarged view of the portion B in FIG. 3.

FIG. 7 is a perspective view illustrating example cartridges before a locking portion of a first cartridge and a locking step of a second cartridge are locked, FIG. 8 is a perspective view of the example cartridges after the locking portion of the first cartridge and the locking step of the second cartridge are locked, FIG. 9 is an enlarged view of the portion A in FIG. 2, and FIG. 10 is an enlarged view of the portion B in FIG. 3.

The cell leads 112 of a battery cell 110, as shown in FIGS. 7 to 10, may include a cathode cell lead 112a and an anode cell lead 112b that are connected to the body 111.

In the battery cell 110, the cathode cell lead 112a and the anode cell lead 112b may be connected to a side and another side of the body 111, respectively, or the cathode cell lead 112a and the anode cell lead 112b may be both connected to a side of the body 111.

In some implementations, both of the cathode cell lead 112a and the anode cell lead 112b of the battery cell 110 are connected to a side of the body 111, which may reduce the volume of the battery pack P.

In these cases, when the cathode cell lead 112a and the anode cell lead 112b of the battery cell 110 are both formed at a side of the body 111, the cathode cell lead 112a and the anode cell lead 112b may be both positioned around the side in the width direction of the cartridge 120.

The cartridge 120 may further have anti-short members 123 and 124 that protrude from the seat part and are disposed between the cathode cell lead 112a and the anode cell lead 112b.

The anti-short members 123 and 124 may protrude from a side in the width direction of the cartridge 120.

The anti-short members 123 and 124 may refer to a locking portion 123 formed at a side of the cartridge 120 and a locking step 124 formed at another side of the cartridge 120, respectively.

The locking portion 123 may be formed at the side in the width direction of the cartridge 120, as shown in FIG. 4. The locking portion 123 and the locking step 124 may protrude in opposite directions at the side in the width direction of the cartridge 120.

A plurality of battery modules 100 may be stacked and the locking portion 123 may be locked to the locking step 124 formed at the cartridge 120 of another adjacently stacked battery module 100. The locking portion 123 may be locked to the locking step 124 formed at the cartridge 120 of a battery module 100 stacked adjacent to the cartridge 120 of another battery module 100.

The locking portion 123 and the locking step 124 may be disposed between the cathode cell lead 112a and the anode cell lead 112b. In this case, the locking portion 123 and the locking step 124 can prevent a short circuit between the cathode cell lead 112a and the anode cell lead 112b.

In some implementations, second locking portions 123' and locking grooves 124' may be formed at the opposite side to the anti-short members 123 and 124 of the cartridge 120, as shown in FIG. 5. The second locking portions 123' of the cartridge 120 may be locked to the locking grooves 124' formed at another adjacent cartridge. The second locking portions 123' and the locking grooves 124' may be formed at another side in the width direction of the cartridge 120.

A plurality of battery modules 100 may be stacked and the second locking portion 123' formed at another side in the width direction of the cartridge 120 may be locked to the locking grooves 124' formed at the cartridge 120 of another adjacently stacked battery module 100.

The second locking portions 123' and the locking grooves 124' formed at another side in the width direction of the cartridge 120 may help combination of cartridges 120 at the opposite side to the anti-short members 123 and 124.

Since the second locking portions 123' and the locking grooves 124' are formed at the opposite side to the cathode cell lead 112a and the anode cell lead 112b, the second locking portions 123' and the locking grooves 124' may not interference with the cathode cell lead 112a and the anode cell lead 112b. A plurality of second locking portions 123' and the locking grooves 124' may be formed at another side in the width direction of the cartridge, for example, the seat part 121 and can firmly fasten an adjacent cartridge.

The separator 200 may have a body 210 that forms the outer shape of the separator 200. First cartridge locking steps 220 may protrude from the body 210. First cartridge coupling grooves 250 may be formed on the body 210.

At least one first cartridge locking step 220 may be formed at a side in the width direction of the separator 200. The first cartridge locking portions formed at a side in the width direction of the separator 200 may be locked to the locking steps 124 formed at a side in the width direction of the cartridge 120 of an adjacent battery module 100.

The first cartridge locking steps 220 formed at a side in the width direction of the separator 200 may be locked to the locking portions 123 of the cartridge 120 of the battery module 100 positioned at one of the left and right sides of the separator 200.

A plurality of first cartridge locking steps 220 may be formed on the separator 200. Any one of the first cartridge locking steps 220 may be locked to the locking portion 123 formed at the cartridge 120 of the battery module 100 at a side of the separator 200. In some cases, another one of the first cartridge locking steps 220 may be locked to the locking portion 123 formed at the cartridge 120 of the battery module 100 at another side of the separator 200.

At least one first cartridge locking step 220 may be formed at another side in the width direction of the separator 200. The first cartridge locking portions formed at another side in the width direction of the separator 200 may be locked to the locking steps 124 formed at another side in the width direction of the cartridge 120 of an adjacent battery module 100.

The first cartridge locking steps 220 formed at another side in the width direction of the separator 200 may be locked to the locking portions 123 of the cartridge 120 of another battery module 100 positioned at one of the left and right sides of the separator 200.

In some examples, first cartridge coupling grooves 250 may be formed on the body 210.

The first cartridge coupling grooves 250 may be formed at a side in the width direction of the separator 200.

The coupling projections 125 formed at a side in the width direction of the cartridge 120 of an adjacent battery module 100 may be inserted in the first cartridge coupling grooves 250 formed at a side in the width direction of the separator 200.

The separator 200 may further have first cartridge coupling grooves 250 formed at another side in the width direction of the separator 200.

The coupling projections 125 formed at another side in the width direction of the cartridge 120 of an adjacent battery module 100 may be inserted in the first cartridge coupling grooves 250 formed at another side in the width direction of the separator 200.

In some examples, the separator 200 may further have first cartridge coupling projections formed at a side in the width direction of the separator 200. The first cartridge coupling projections may be formed on the body 210.

The first cartridge coupling projections formed at a side in the width direction of the separator 200 may be inserted in the coupling grooves formed at a side in the width direction of the cartridge 120 of an adjacent battery module 100.

The separator 200 may further have first cartridge coupling projections formed at another side in the width direction of the separator 200.

The first cartridge coupling projections formed at another side in the width direction of the separator 200 may be inserted in the coupling grooves formed at another side in the width direction of the cartridge 120 of an adjacent battery module 100.

The battery pack P, referring to FIG. 3, may further include end covers 300 attached to the outermost battery modules 100. The end covers 300 may each include a horizontal plate 310. The end covers 300 may include second cartridge locking portions 330 protruding from the horizontal plate 310. Alternatively, the end covers 300 may each have second cartridge locking steps formed on the horizontal plate 310.

The second cartridge locking steps may be formed at a side in the width direction of the end cover 300.

The second cartridge locking steps formed at a side in the width direction of the end cover 300 may be locked to the locking portions 123 formed at a side in the width direction of the cartridge 120 of an adjacent battery module 100.

The end covers 300 may each further have second cartridge locking steps formed at another side in the width direction of the end covers 300.

The second cartridge locking steps formed at another side in the width direction of the end cover 300 may be locked to the locking portions 123 formed at another side in the width direction of the cartridge 120 of an adjacent battery module 100.

The end covers 300 may each further have second cartridge locking portions 330 formed at a side in the width direction of the end covers 300.

The second cartridge locking portions 330 formed at a side in the width direction of the end cover 300 may be locked to the locking steps 124 formed at a side in the width direction of the cartridge 120 of a battery module 100 that is adjacent to the end cover 300.

The end covers 300 may each further have second cartridge locking portions 330 formed at another side in the width direction of the end covers 300.

The second cartridge locking portions 330 formed at another side in the width direction of the end cover 300 may be locked to the locking steps 124 formed at another side in the width direction of the cartridge 120 of a battery module 100 that is adjacent to the end cover 300.

Further, the end covers 300 may each have second cartridge coupling projections 340 formed on the horizontal plate 310. The second cartridge coupling projections 340 may be formed at a side in the width direction of the end cover 300. The second cartridge coupling portions 340 formed at a side in the width direction of the end cover 300 may be inserted in the coupling grooves formed at a side in the width direction of the cartridge 120 of a battery module 100 that is adjacent to the end cover 300.

The end covers 300 may each further have second cartridge coupling projections 340 formed at another side in the width direction of the end covers 300. The second cartridge coupling projections 340 formed at another side in the width direction of the end cover 300 may be inserted in the coupling grooves formed at another side in the width direction of the cartridge 120 of a battery module 100 that is adjacent to the end cover 300.

The end covers 300 may each further have second cartridge coupling grooves formed at a side in the width direction of the end covers 300. The coupling projections 125 formed at a side in the width direction of the cartridge 120 of a battery module 100 that is adjacent to the end cover 300 may be inserted in the second cartridge coupling grooves formed at a side in the width direction of the end cover 300.

The end covers 300 may each further have second cartridge locking grooves formed at another side in the width direction of the end covers 300. The coupling projections 125 formed at another side in the width direction of the cartridge 120 of a battery module 100 that is adjacent to the end cover 300 may be inserted in the second cartridge coupling grooves formed at another side in the width direction of the end cover 300.

The end plates 400 may be disposed in contact with the end covers 300. The end plates 400 may be disposed by the outermost battery modules 100. The end plates 400 may be arranged in parallel with the outermost battery modules 100. The end covers 300 may be disposed by the end plates 400 and the outermost battery modules 100, respectively.

The end covers 300 may each include the horizontal plate 310 and the horizontal plates 310 may be disposed in contact with the end plates 400.

The end covers 300 may each further have guides 320 that protrude from the horizontal plates 310 toward the end plates 400. The end plates 400 may each include a pressing plate 410 that is in contact with end cover 300. Guide holes 430 in which the guides 320 are inserted may be formed at the pressing plates 410.

When the guides 320 is inserted in the guide holes 430, the end cover 300 and the end plate 400 can be fixed in positions respect to each other.

The battery pack P may further include the brackets 700. The brackets 700 may fix a plurality of battery modules 100 and the separator 200 to each other, and may fix the end covers 300 and the end plates 400 to each other.

In some implementations, the battery pack P may include a pair of brackets 700. The battery modules 100 may be disposed between the pair of brackets 700. The separator 200 may be positioned between a pair of battery modules 100 in the left-right direction and between the pair of brackets 700 in the front-rear direction. The brackets 700 may be arranged to face the width-directional sides of the cartridges 120.

The brackets 700 may be fixed to the separator 200.

The battery pack may further have bolting portions for fixing the brackets 700 to the separator 200.

The brackets 700 may have separator fastening portions 710 that are fixed to the separator 200. The separator 200 may have first bracket fastening portions 230 to which the brackets 700 are fixed. The brackets 700 and the separator 200 can be fixed by fasteners S1 that pass through the separator fastening portions 710 and the first bracket fastening portions 230.

The fasteners S1 may be bolts, and the separator fastening portions 710 and the first bracket fastening portions 230 may be bolting portions for fixing the brackets 700 to the separator 200.

In some examples, the brackets 700 may be fixed to the end plates 400. The brackets 700 may be each fixed to the end plates 400.

The battery pack may further have bolting portions for fixing the brackets 700 to the end plates 400.

The brackets 700 may have end plate fastening portions 720 that are fixed to the end plates 400. The end plates 400 may have second bracket fastening portions 420 to which the brackets 700 are fixed. The brackets 700 and the end plates 400 can be fixed by fasteners S2 that pass through the end plate fastening portions 720 and the second bracket fastening portions 420.

The fasteners S2 may be bolts, and the end plate fastening portions 720 and the second bracket fastening portions 420 may be bolting portions for fixing the brackets 700 to the end plates 400.

In some related example battery packs, the entire structure was fixed by long bolts that pass through a plurality of battery modules 100. According to an implementation of the present disclosure, the battery modules 100 can be stacked by coupling the locking portions 123 and the locking steps 124. Further, the entire structure of the battery pack can be fixed by the brackets 700 that fix the battery modules 100 and the separator 200 to each other and fix the end covers 300 and the end plates 400 to each other. Since the battery pack P according to an implementation of the present disclosure includes the brackets 700, it may be possible to reduce the volume and weight of the battery pack P. Further, as the volume and weight of the battery pack P are reduced, the energy density per unit volume of the battery pack P can be increased.

The battery pack P may further include connection board assemblies 500 and 600 disposed between the cartridges 120 and the brackets 700 and connected with the cells. The connection board assemblies 500 and 600 can be connected with the cell leads 112. The connection board assemblies 500 and 600 may include connection boards 500 that include a bus bar 402 being in contact with the cell leads 112 and a PCB 504 electrically connected with the bus bar 402 and board covers 600 that are combined with the connection boards 500 to cover the bus bars 402 and the PCBs 504.

The connection board assemblies 500 may be disposed between any one of the brackets 700 and the battery modules 100.

Any one of the brackets 700 may face the connection board assemblies 500 and 600 and the direction in which any one of the brackets 700 faces the connection board assemblies 500 and 600 may be perpendicular to the stacking direction of the battery modules 100. For example, when the battery modules 100 are stacked in the left-right direction, any one of the brackets 700 may face the connection board assemblies 500 and 600 in the front-rear direction.

The other one of the brackets 700 may form the outer sides of the seat parts 121 of the battery modules 100. The direction in which the other one of the brackets 700 faces the seat parts 121 may be perpendicular to the stacking direction of the battery modules 100. For example, when the battery modules 100 are stacked in the left-right direction, the other one of the brackets 700 may face the seat parts 121 in the front-rear direction.

Figure 11:
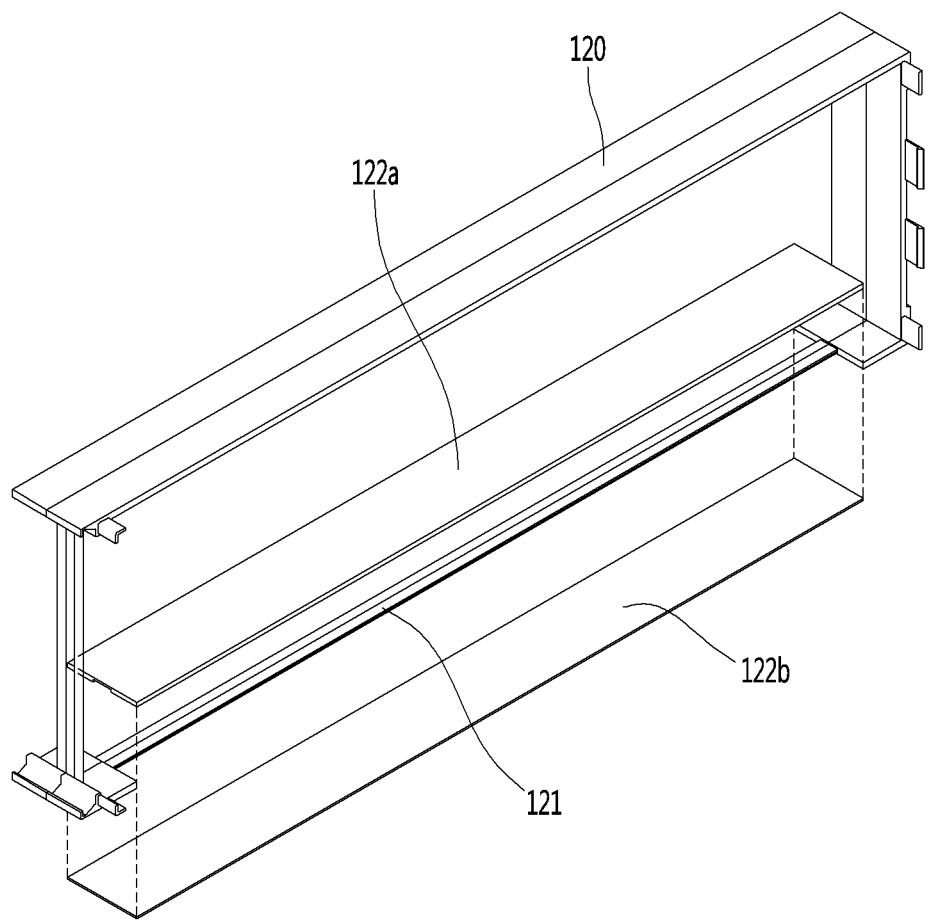
FIG. 11 is a perspective view of an example cartridge that is included in another example battery pack.

FIG. 11 is a perspective view illustrating an example cartridge that is included in an example battery pack.

In this implementation, only the configuration and operation different from those of the previous implementation will be described and the configuration and operation the same as or similar to those of the previous implementation will be omitted.

A heat dissipation part 122 according to this implementation may include a first heat dissipation member 122a and a second heat dissipation member 122b connected with the first heat dissipation member 122a. The heat dissipation part 122 may be an assembly of the first heat dissipation member 122a and the second heat dissipation member 122b. A portion of a seat part 121 may be disposed between the first heat dissipation member 122a and the second heat dissipation member 122b.

When the first heat dissipation member 122a and the second heat dissipation member 122b are combined, they may cover a portion of the seat part 121. That is, a portion of the seat part 121 may be disposed and protected between the first heat dissipation member 122a and the second heat dissipation member 122b, and the first heat dissipation member 122a, a portion of the seat part 121, and the second heat dissipation member 122b may support together battery cells 110 and absorb heat from the battery cells 110.

The above description is an example that explains the spirit of the present disclosure and may be changed and modified in various ways without departing from the basic features of the present disclosure by those skilled in the art.

Accordingly, the implementations described herein are provided not to limit, but to explain the spirit of the present disclosure and the spirit and the scope of the present disclosure are not limited by the implementations.

The protective range of the present disclosure should be construed on the basis of claims and all the technical spirits in the equivalent range should be construed as being included in the scope of the right of the present disclosure.

What is claimed is:

1. A battery pack comprising:
    a first plurality of battery modules that are electrically connected to a first ground;
    a second plurality of battery modules that are electrically connected to a second ground, the second plurality of battery modules being stacked next to the first plurality of battery modules;
    a separator that is disposed between the first plurality of battery modules and the second plurality of battery modules, the separator being configured to electrically separate the first and second grounds;
    a bracket that is coupled to the separator and covers a side of each of the first plurality of battery modules and the second plurality of battery modules;
    a first board assembly is located between the bracket and the side of the first plurality of battery modules; and
    a second board assembly that is located between the bracket and the side of the second plurality of battery modules,
    wherein each battery module in the first and second pluralities of battery modules includes a battery cell and a cartridge configured to receive the battery cell, and
    wherein the cartridge includes:
        a seat part configured to seat the battery cell, and
        a heat dissipation part made of a first type of material different from a second type of material of the seat part, the heat dissipation part being configured to absorb heat generated from the battery cell.

2. The battery pack of claim 1, wherein the separator includes a cartridge locking step that protrudes from an end of the separator toward the bracket, the cartridge locking step being configured to couple to the first and second pluralities of battery modules.

* * * * *